United States Patent [19]

Mork

[11] Patent Number: 5,771,980
[45] Date of Patent: Jun. 30, 1998

[54] SOIL LEVELING APPARATUS WITH IMPROVED FRAME AND HITCH

[76] Inventor: Orlan H. Mork, 6029 225th St. West, Farmington, Minn. 55024

[21] Appl. No.: 642,225

[22] Filed: Apr. 30, 1996

Related U.S. Application Data

[62] Division of Ser. No. 68,126, May 25, 1993, Pat. No. 5,511,625.

[51] Int. Cl.[6] .................................................. A01B 63/00
[52] U.S. Cl. ...................... 172/501; 172/445.1; 172/503; 172/449; 172/605; 172/684.5; 403/3
[58] Field of Search ................................ 172/439, 445.1, 172/501, 503, 684.5, 777, 448, 449, 605, 502, 299; 403/3, 4

[56] References Cited

U.S. PATENT DOCUMENTS

| | | | |
|---|---|---|---|
| 2,627,797 | 2/1953 | Acton | 172/501 |
| 3,692,121 | 9/1972 | Kenney | 172/568 X |
| 3,731,749 | 5/1973 | Sullivan et al. | 172/401 |
| 3,797,580 | 3/1974 | Roth | 172/501 X |
| 4,074,766 | 2/1978 | Orthman | 172/311 |
| 4,193,458 | 3/1980 | Meinert et al. | 172/448 X |
| 4,448,258 | 5/1984 | Mork | 172/445.1 X |
| 4,516,639 | 5/1985 | Hammarlund et al. | 172/501 X |
| 4,585,075 | 4/1986 | Mork | 172/445.1 X |
| 4,615,397 | 10/1986 | Hastings | 172/501 X |
| 4,924,945 | 5/1990 | Mork | 172/445.1 X |
| 5,024,280 | 6/1991 | Mork | 172/445.1 X |
| 5,135,057 | 8/1992 | Dircks | 172/501 X |
| 5,191,943 | 3/1993 | Minor et al. | 172/445.1 X |
| 5,209,307 | 5/1993 | Hotte | 172/501 X |
| 5,213,164 | 5/1993 | Mork | 172/445.1 |
| 5,511,625 | 4/1996 | Mork | 172/445.1 |

*Primary Examiner*—Terry Lee Melius
*Assistant Examiner*—Victor Batson
*Attorney, Agent, or Firm*—James W. Miller

[57] ABSTRACT

An improved soil leveling apparatus includes a hitch (202 or 302) for connecting the frame to the loader arms and tilt cylinder(s) of a skid steer loader. The hitch (302) includes a hitch plate (304) that can selectively be made rigid with the frame or can selectively be allowed to pivot fore-and-aft relative to the frame. This allows the operator to select the rigid orientation of the frame when it is desired to have the frame be rigid relative to the loader or to select the floating, pivotal orientation depending upon ground terrain and other factors.

20 Claims, 13 Drawing Sheets

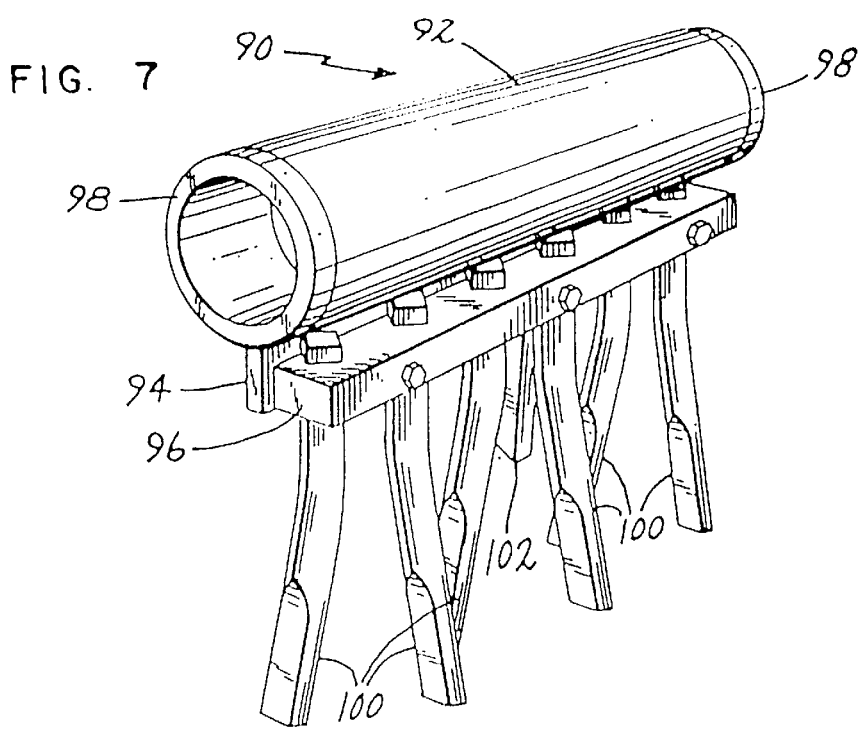
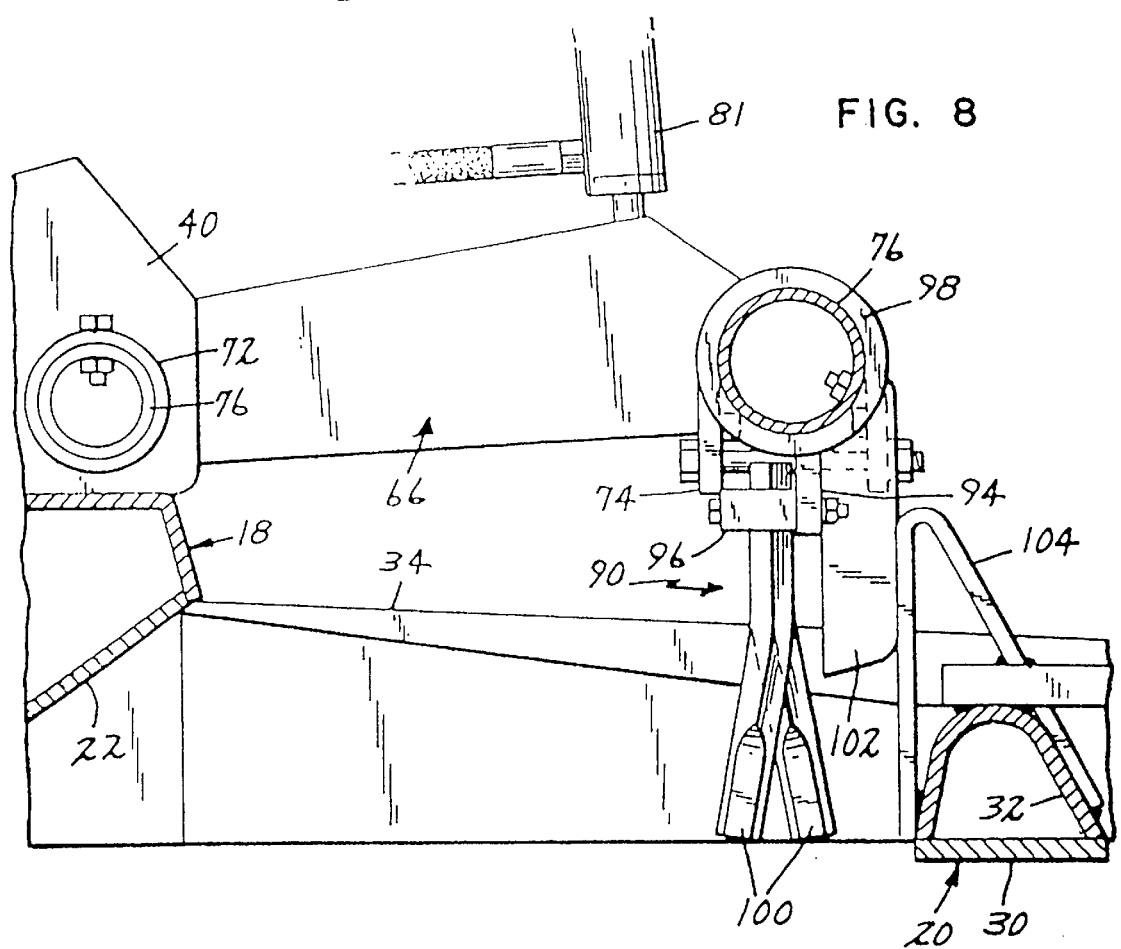

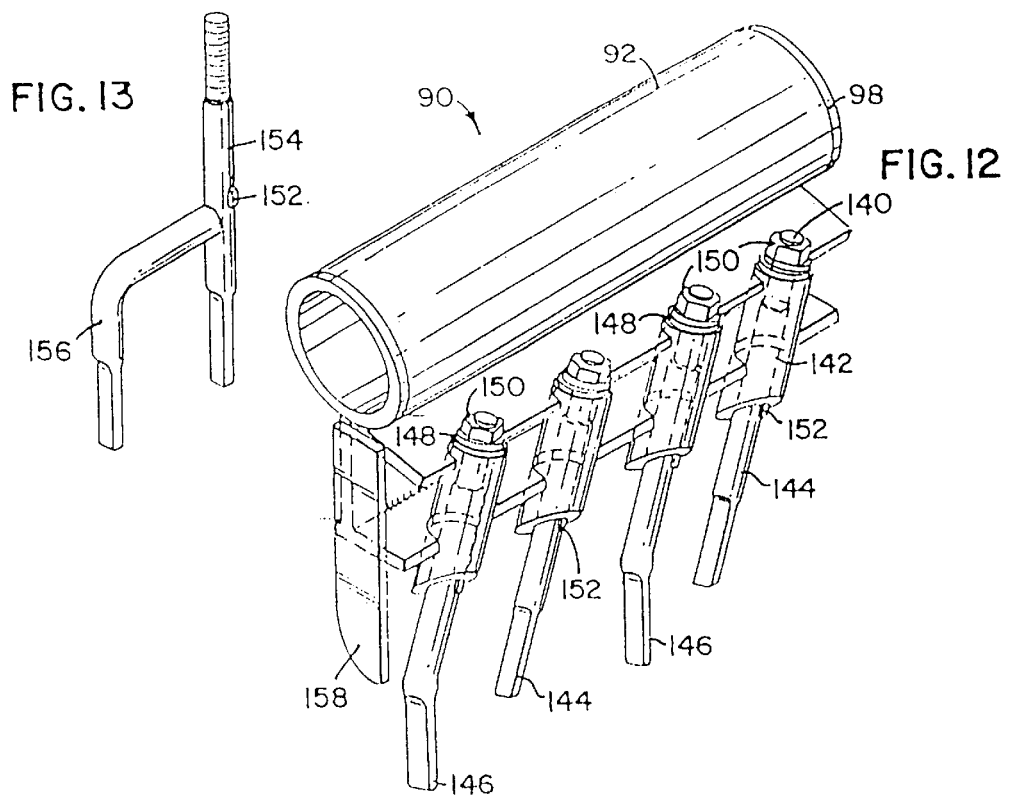
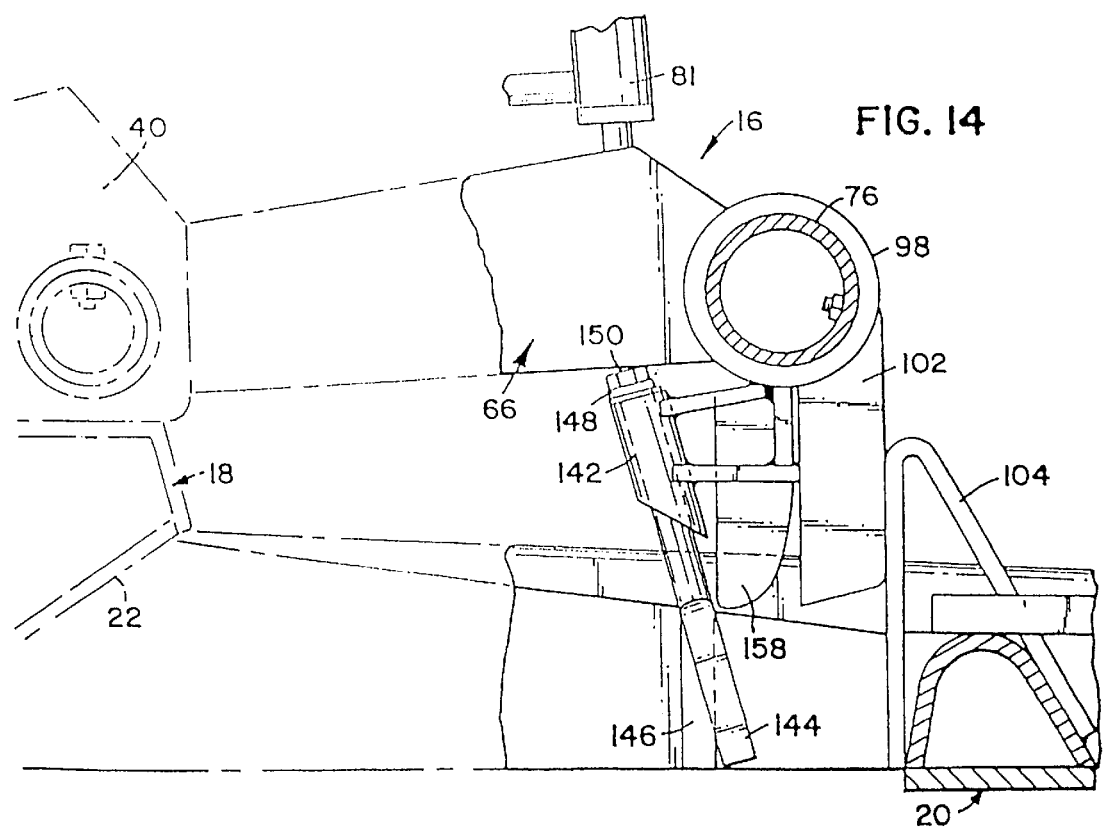

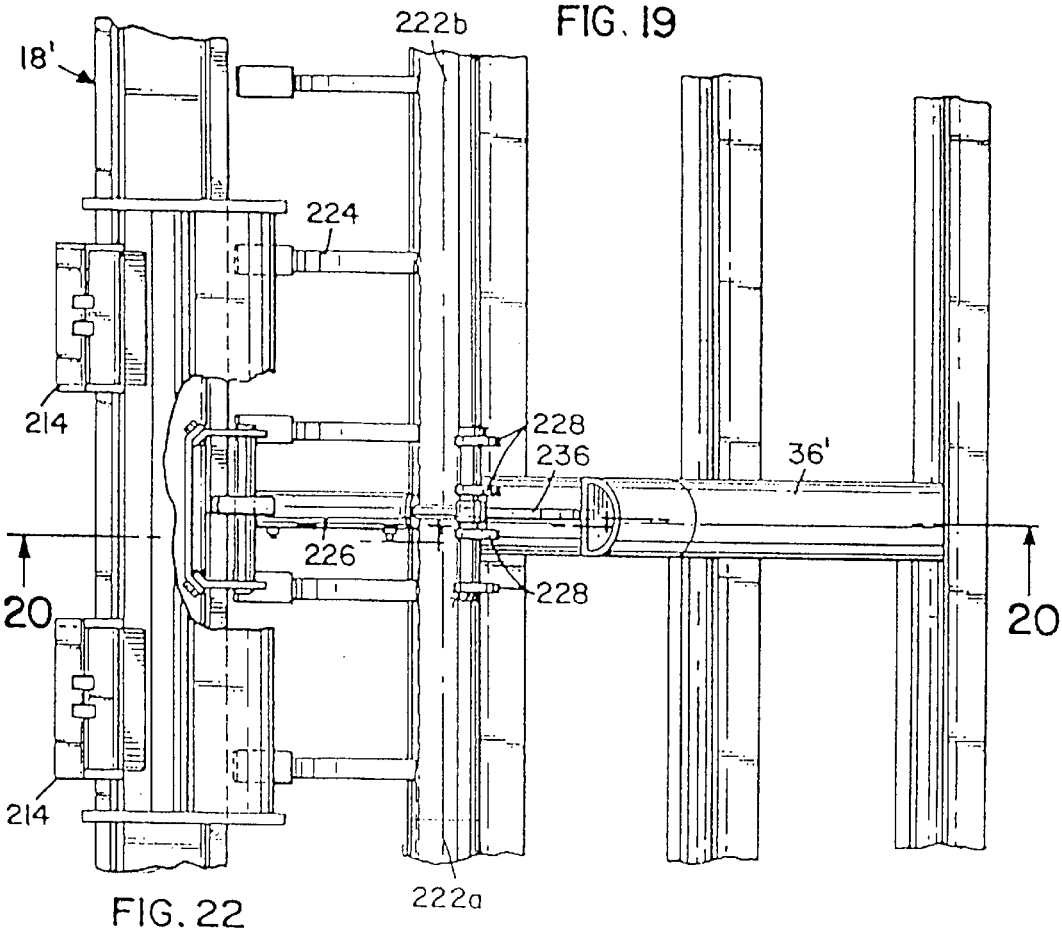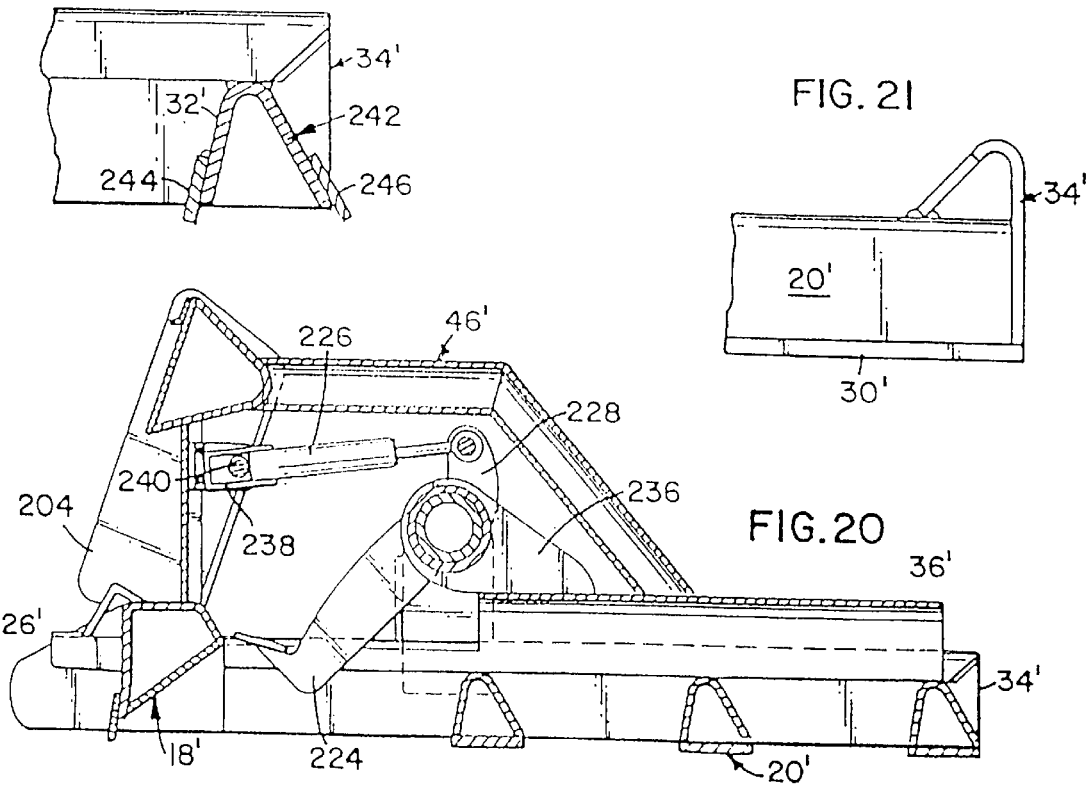

SOIL LEVELING APPARATUS WITH IMPROVED FRAME AND HITCH

CROSS REFERENCE TO RELATED APPLICATIONS

This application is a division of my application Ser. No. 08/068,126, filed May 25, 1993, now U.S. Pat. No. 5,511,625.

TECHNICAL FIELD

The present invention relates generally to a device for attachment to a vehicle for cutting, leveling and otherwise grading the soil or the like. More particularly, this invention concerns a soil leveling apparatus incorporating an improved frame, an improved hitch, and improved scarifier assembly, an optional pulverized attachment, and other features which provide more versatility and controllability to achieve better performance.

BACKGROUND ART

Proper site preparation requires that the ground be graded as necessary for compatibility with planting, sodding, paving or whatever the next and usually final construction or maintenance step may be. Such site preparation typically involves first breaking up and loosening the soil as necessary followed by leveling the soil to the desired grade. This may entail the use of different tools, depending upon the soil conditions, and multiple passes over the site which is both time consuming and expensive.

In the past weighted boards and the like were dragged behind tractors to smooth and level the surface of the soil. This technique was relatively crude and unsatisfactory because it did not allow for controlling the angle or grade of the soil surface, and loose dirt tended to collect in front of the board which would escape around the outer edges leaving ridges which then had to be smoothed manually with rakes or the like.

My prior U.S. Pat. No. 3,556,228 shows an apparatus for leveling soil and the like which was adapted to overcome the difficulties associated with the prior art at that time. This device generally consisted of a frame adapted for connection to a three-point hitch on a draft vehicle such as a tractor. The frame consisted of a number of transverse ground engaging members arranged in longitudinally spaced apart relationship. The leading member therein was a member of generally inverted U-shaped cross section to effect cutting, while the other trailing members were of closed, generally rectangular cross section for leveling purposes. The transverse ground engaging members were interconnected by longitudinal braces in a ladder-like fashion to form a rigid frame. Individual retaining shoes or plates were provided on opposite ends of each ground engaging member to retain loose soil to avoid formation of soil ridges.

This device operated well and was a significant improvement over the prior art at that time, although experience later showed that improvements could be made. The parent hereof, referenced above, discloses such an improved soil leveling apparatus. It has been found, however, that even this device can be improved upon. For example, under some soil conditions it has been found that the effectiveness of a leading ground engaging member of generally inverted U-shaped cross section can be severely restricted if it should become plugged with soil. In addition, three-point hitches of various types and ages exhibit various degrees of looseness which may not be compatible with different soil conditions.

Some degree of play or looseness at the top link of the three-point hitch is generally desirable because it enables the apparatus to float somewhat on the soil surface without undue gouging, however, too much looseness is undesirable.

Further, some conditions may call for soil working relatively less aggressive, but which is desired as a substitute for or in addition to, that type of soil working provided by the scarifier assembly.

There is, thus, a need for an improved soil leveling apparatus of even greater versatility.

SUMMARY OF THE INVENTION

The present invention comprises an improved soil leveling apparatus which overcomes the foregoing and other difficulties associated with the prior art. In accordance with the invention, there is provided a soil leveling apparatus having an improved frame, connection means for the hitch, and other features and options which enhance its capability and versatility.

The frame comprises a plurality of transverse ground engaging members, the leading member being a scraper member of generally inverted J-shaped cross section in order to avoid soil plugging. The frame includes a pair of laterally spaced apart side frame members which are of uneven channel-like configuration secured to opposite ends of the trailing ground engaging member so as to reduce construction costs while providing the necessary structural rigidity.

The trailing ground engaging members are of generally inverted rounded V-shaped cross section in order to provide a substantially upright surface for pushing the coil in a forward direction, with an inclined surface for lifting the soil in a rearward direction.

The connection means on the frame for securing the apparatus to a three-point hitch is of generally A-shaped configuration, which is also adapted to serve as the support for the ajustable scarifier assembly. This also simplifies construction of the soil leveling apparatus and enhances the structural integrity thereof. An adjustable lost motion linkage is preferably provided at the top end of the connection means for receiving the top link of a three-point hitch in order to provide the degree of play desirable under the particular conditions.

BRIEF DESCRIPTION OF DRAWINGS

A better understanding of the invention can be had by reference to the following Detailed Description in conjunction with the accompanying Drawings, wherein:

FIG. 6 is a vertical sectional view taken along lines 6—6 of FIG. 5 in the direction of the arrows;

FIG. 7 is an enlarged perspective detailed view showing a tine assembly which can be substituted for the teeth of the scarifier assembly in order to provide relatively less aggressive soil working action;

FIG. 8 is a sectional detailed view showing the tine assembly of FIG. 7 mounted on the cross-shaft of the scarifier assembly;

FIG. 12 is an enlarged perspective detailed view of a modified tine assembly;

FIG. 13 is an enlarged perspective view of an offset tine that can be used in the tine assembly of FIG. 12;

FIG. 14 is a sectional detailed view showing the tine assembly of FIG. 12 mounted on the cross shaft of the scarifier assembly of the first embodiment;

FIG. 19 is a partial top view of a modified scarifier assembly;

FIG. 20 is a vertical cross sectional view taken along lines 20—20 of FIG. 19 in the direction of the arrows;

FIG. 21 is a partial end view of the soil leveling apparatus showing the configuration of the side members;

FIG. 22 is a diagram showing an alternative construction of the trailing ground engaging members;

DETAILED DESCRIPTION

The entire disclosure of U.S. Pat. No. 4,448,258 is incorporated by reference.

Figure 1:
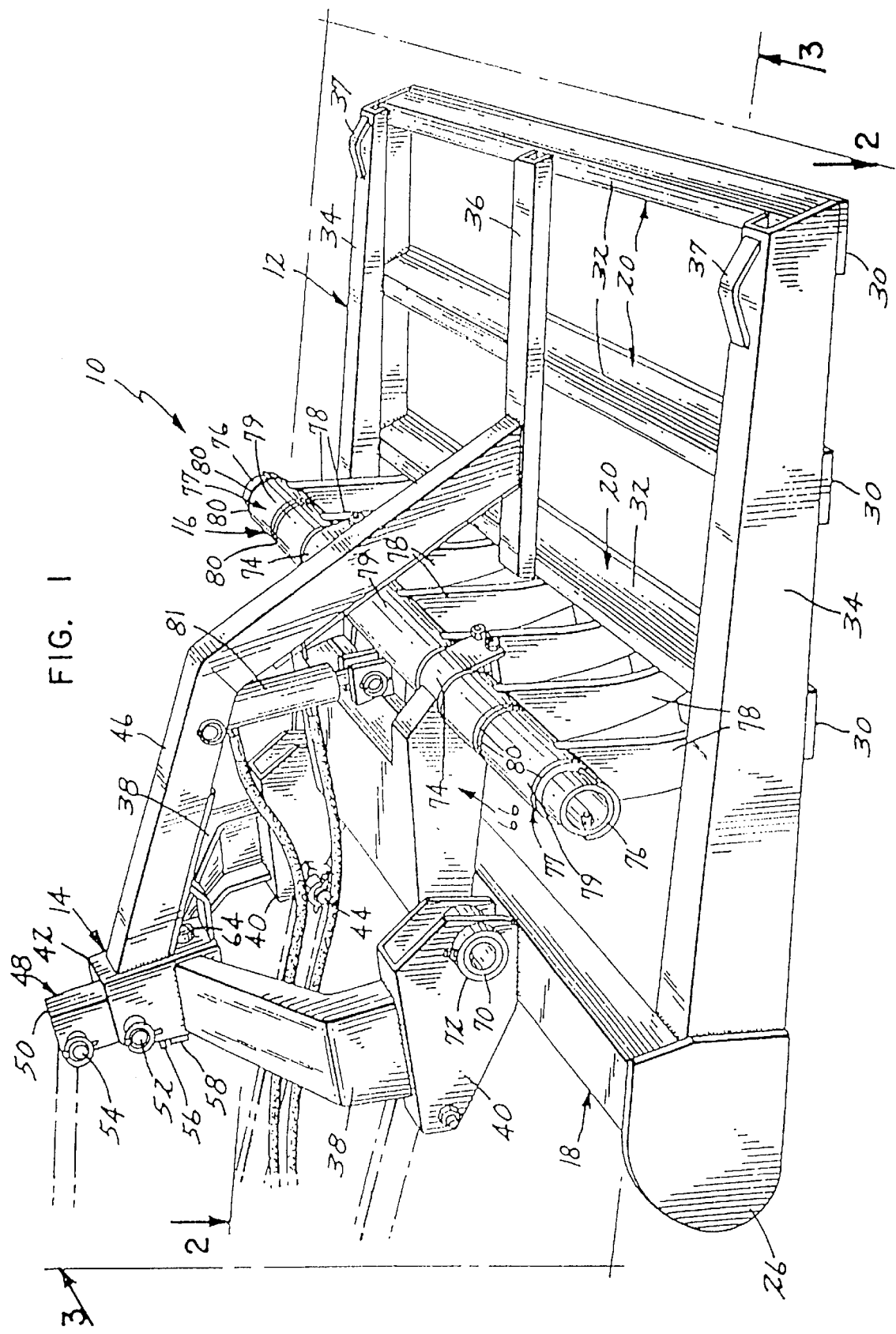
FIG. 1 is a perspective view of an improved soil leveling apparatus incorporating a first embodiment of the invention.

Referring now to the Drawings herein, in which like reference numerals designate like or corresponding elements throughout the views, and particularly referring to FIG. 1, there is shown a soil leveling apparatus 10 of the invention. The apparatus 10 comprises a frame 12, a hitch or connection means 14 mounted on the frame for attachment of the apparatus to a suitable draft means, and a scarifier assembly 16.

As illustrated, the connection means 14 is adapted for use with a three-point hitch, however, it will be appreciated that the frame 12 of the apparatus 10 can be provided with a connection means like that shown in the parent application for use with a skid-steer vehicle or any other suitable connecting hitch means depending upon the type of draft vehicle with which the apparatus is to be used.

Figure 2:
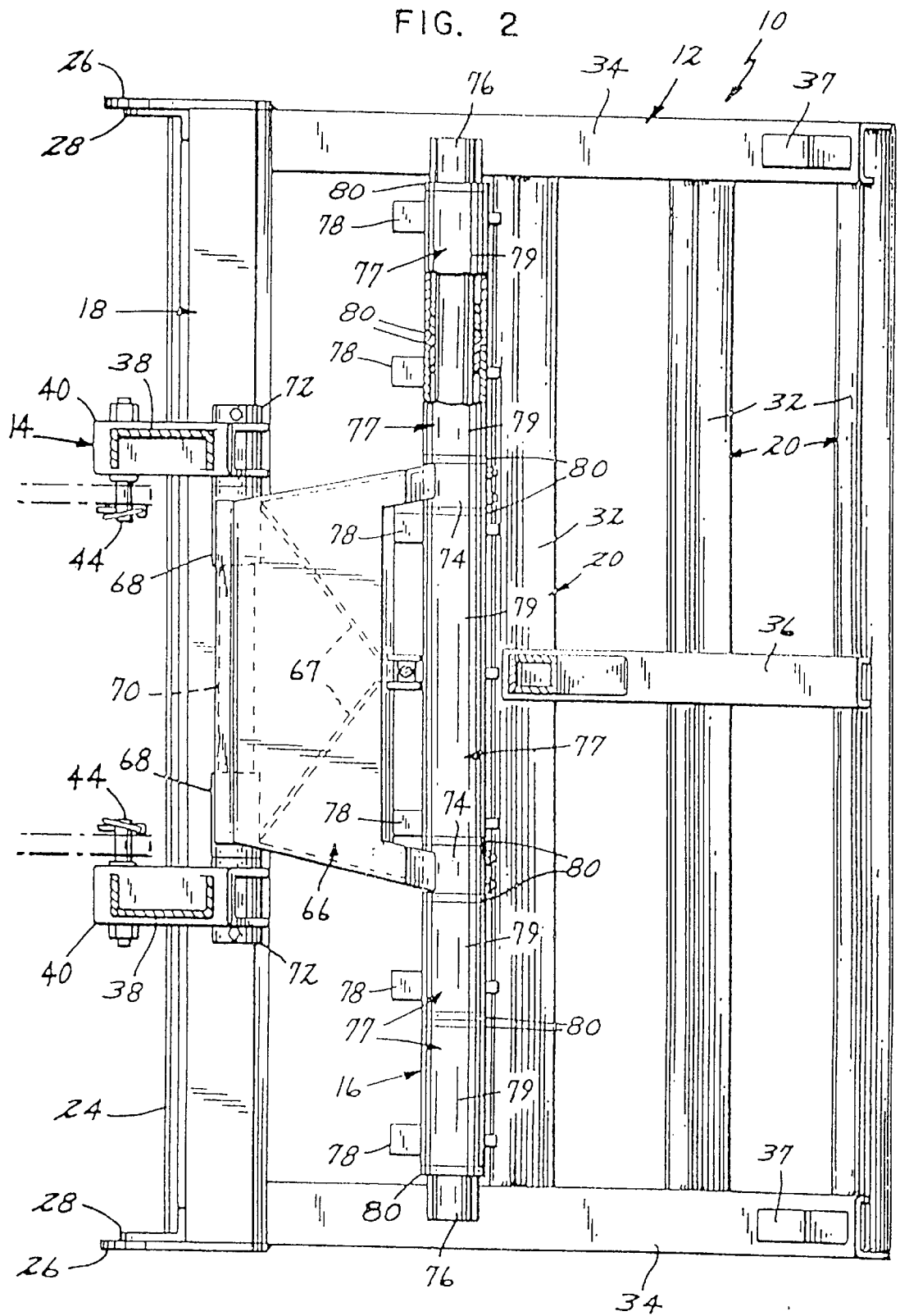
FIG. 2 is a horizontal sectional view taken along lines 2—2 of FIG. 1 in the direction of the arrow.
Figure 3:
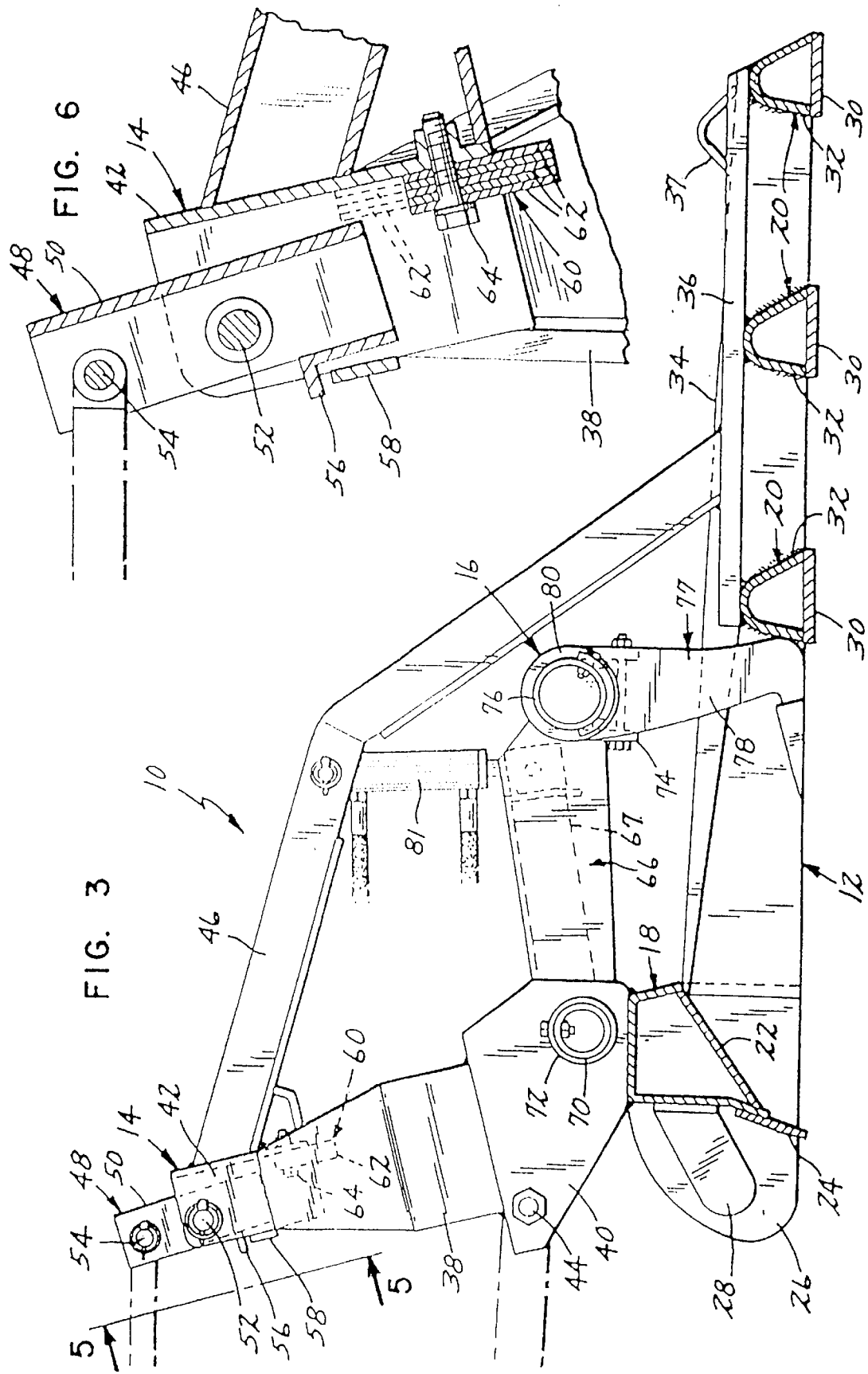
FIG. 3' is a vertical sectional view taken along lines 3—3 of FIG. 1 in the direction of the arrows.

Referring now to FIG. 1 in conjunction with FIGS. 2 and 3, the frame 12 of the soil leveling apparatus 10 comprises a leading ground engaging members 20. All of the ground engaging members 18 and 20 are oriented transverse to the direction of travel of the apparatus 10. The forward ground engaging member 18, as is best seen in FIG. 3, is of generally inverted J-shaped cross section and includes braces 22 secured between the divergent front and back walls of the ground engaging member. A blade 24 is secured to the front, relatively longer wall of the ground engaging member 18 for better cutting action and wear resistance. The blade 24 can be welded, bolted or otherwise suitably secured to the forward ground engaging member 18. It will thus be apparent that the rear wall of the forward ground engaging member 18 is relatively shorter than the front wall. This is advantageous because it provides rigidity without allowing soil to plug the interior of the member, which can occur under certain conditions when an inverted channel section is utilized for the forward ground engaging member. The forward ground engaging member 18 thus functions as a scraper member.

The forward ground engaging member 18 is secured between a pair of side plates 26 which serve as soil retainers to prevent the soil from flowing outwardly around the apparatus and thus forming ridges. If desired, braces 28 can be secured between the soil retaining plates 28 and the forward ground engaging member 18 for reinforcement.

A plurality of trailing ground engaging members 20 are located behind the forward ground engaging merger 18 for purposes of leveling the soil. Three trailing ground engaging members 20 are shown, however, any suitable number can be utilized. Each trailing ground engaging member 20 includes a wear plate 30 secured to and enclosing the open end of a hollow member 32. The hollow member 32 is preferably of generally inverted rounded V-shaped cross section with the forward wall thereof being substantially upright in order to push the soil in a forward direction, and the rear wall being inclined to allow the soil to pass over the ground engaging member in the reverse direction.

The trailing ground engaging members 20 are secured between a pair of longitudinal side members 34. Each side member 34 is of general channel-shaped cross section along the portion thereof extending between the trailing ground engaging members 20 with the upper surfaces of the side members sloping downwardly away from the forward ground engaging member 18. The ends of the trailing ground engaging members 20 are thus butted against the outer legs of the side members 34 and are welded at their ends both to the outer leg and to the lower edge of the inner legs of the side members. A longitudinal member 36 is preferably secured across the tops of the trailing ground engaging members 20 for additional rigidity. If desired, lugs 37 can be attached to the side members 34 for connection of a drag or the like to the apparatus 10.

The connection means 14 is of generally A-shaped configuration including a pair of legs 38 which are secured at their lower ends to a pair of laterally spaced apart feet or supports 40 secured to the forward ground engaging member 18. The legs 38, which are inclined forwardly as shown, extend upwardly to a member 42. The connection means 14, as illustrated, is adapted for use with a three-point hitch, the top and bottom links of which are indicated by phantom lines. The base supports 40 include pivotal connection points 44 for attachment to the bottom links of a three-point hitch, while the top member 42 is adapted for attachment to the top link of the three-point hitch. A longitudinal brace 46 is preferably connected between the top member 42 of the connection means 14 and the longitudinal member 36 of the frame 12.

Figure 5:
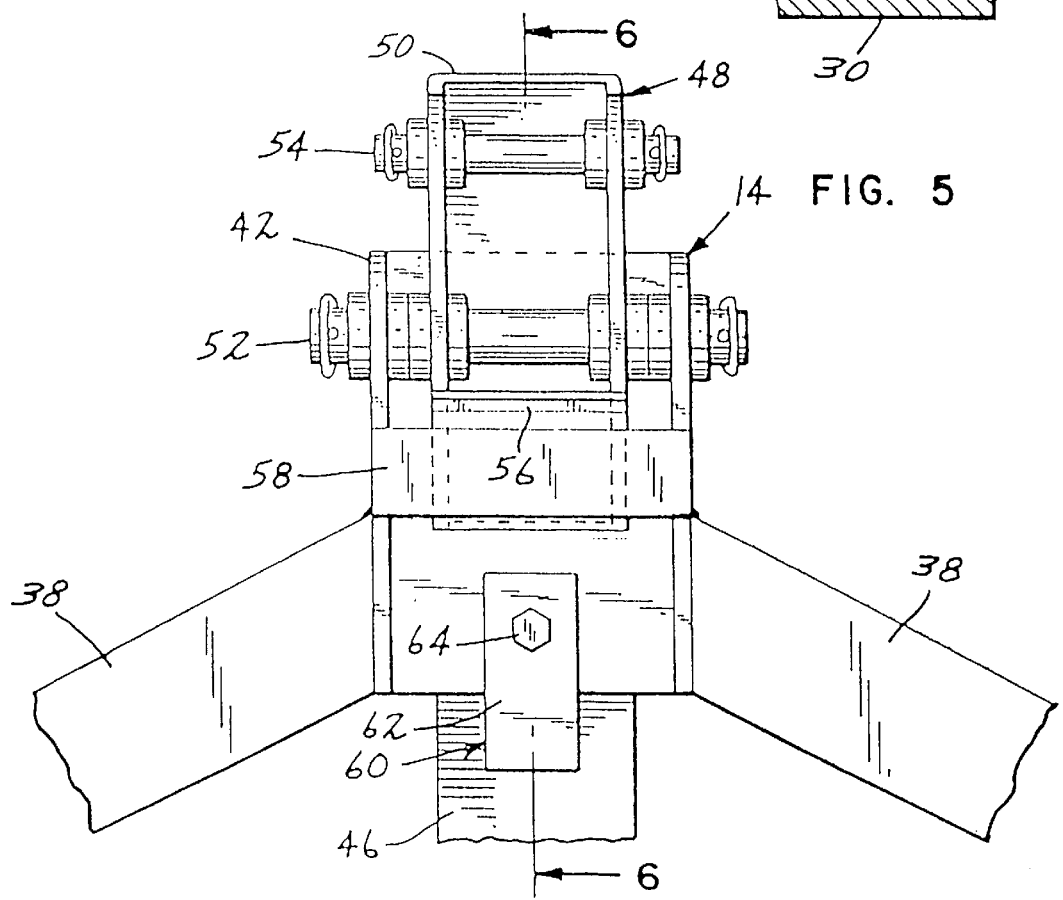
FIG. 5 is a view taken along lines 5—5 of FIG. 3 showing the front side of the adjustable lost motion linkage mounted at the top end of the connection means.

Referring to FIG. 3 in conjunction with FIGS. 5 and 6, the soil leveling apparatus 10 preferably includes a lost motion linkage 48 in the top member 42 of the connecting means 14. The purpose of the lost motion linkage 48 is to provide an adjustable amount of controlled play between the top link of the three-point hitch on the draft vehicle (not shown) and the connection means 14 so that some pivotal floating action of the soil leveling apparatus can occur. The lost motion linkage 48 includes a plate 50, which is illustrated as being a section of channel stock, supported for pivotal movement on a pin 52 extending across the top member 42. Another pivotal connection 54 is provided at the upper end of the plate 50 for attachment to the top link of the three-point hitch on the draft vehicle. A first stop 56 is secured to the lower end of the plate 50 for cooperation with a cross piece 58 extending across the lower end of the top member 42. The lost motion linkage 48 thus includes a fixed stop which limits rearward pivotal motion of the plate 50. An adjustable stop 60 is also provided for limiting forward pivoting of the plate 50. As illustrated, the adjustable stop 60 comprises a number of shims 62 with offset holes therein through which a bolt 64 extends to secure the shims to the inside of the top member 42. It will thus be appreciated that the amount of pivotal motion of the plate 50 can be controlled by loosening the bolt 64 and turning a suitable number of shims upwardly between the lower end of the plate 50 and the back of the top member 42, as shown in FIG. 1, and then tightening the shims in place with the bolt 64 so as to limit the range of fore/aft pivotal movement of the linkage 48. This comprises a significant feature of the present invention. By means of the adjustable lost motion linkage 48, suitable play can be provided between the top link of a three-point hitch and the connection means 14 of the soil leveling apparatus 10.

Referring again to FIGS. 1 through 3, the soil leveling apparatus 10 preferably includes a scarifier assembly 16 which is mounted for adjustable, vertical positioning relative to the frame 12. The scarifier assembly 16 includes a single connector 66 having a pair of sleeves 68 secured at the forward end for receiving a cross shaft 70 extending between the base members 40 of the connection means 14. The cross shaft 70 extends through the sleeves 68 of the connectors 66 and through bushed holes in the base members 40, and is retained in place be means of collars 72.

The connector 66, which is preferably formed from a piece of plate bent as shown for rigidity, also includes a pair of clamps 74 at the side opposite that of the sleeves 68. Clamps 74 function to secure the pivotal connector 66 to a second, relatively longer cross shaft 76 on which the teeth subassemblies 77 are suspended in side-by-side relationship between end caps 75. Each subassembly 77 includes a depending tooth 78 secured to its upper end to a sleeve 79 pivotally supported on the second cross shaft 76. The scarifier teeth 78 can be individually pivoted to the cross shaft 76, or pivotally supported in groups. Bushings 80 are provided in the ends of each sleeve 79. A double acting cylinder 81 is connected between the top brace 46 and a pair of lugs on the connector 66 for controlling the position of the scarifier assembly 16 and thus the extent of penetration into the soil by the teeth 78.

If desired, a pair of diagonal braces 67, as is best seen in FIG. 2, can be provided on the underside of the connector 66 for reinforcement.

Figure 4:
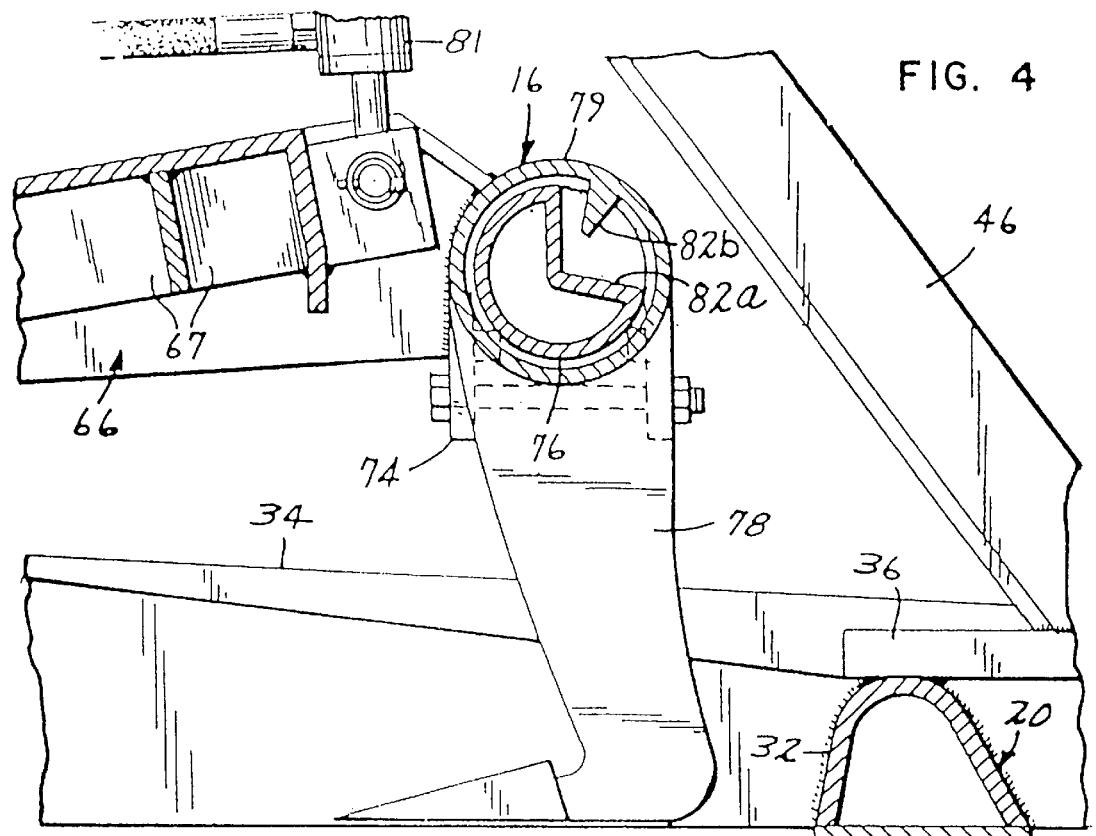
FIG. 4 is an enlarged detailed view of a modification of the scarifier stop assembly.

Referring momentarily to FIG. 4, there is shown a modification of the scarifier assembly 16. The scarifier assembly 16 as shown in FIGS. 1 through 3 includes a number of pivotal scarifier teeth 78 whose rearward pivotal motion is limited by the adjacent trailing ground engaging member 20.

The longitudinal spacing between the forward ground engaging member 18 and the next adjacent ground engaging member 20 is preferably sufficient to allow the scarifier teeth 78 to pivot forwardly out of ground engagement when the apparatus 10 is reversed. In some situations, however, it may be desirable to limit pivotal movement of the scarifier teeth 78 by means other than the next adjacent trailing ground engaging member 20. For example, the second cross shaft 76 can be notched as shown in FIG. 4 for cooperation with an inwardly projecting stop 82 provided on the sleeve supporting the tooth. The particular orientation of the notch in the cross shaft 76 and the stop 82 is not critical to the invention, however, in some situations it may be desirable to rotate their position about 150 degrees clockwise from that shown for better load distribution. Those skilled in the art will appreciate that the disclosed stop arrangement can be reversed so that a stop member is provided on the cross shaft 76 for cooperation with a notch in the sleeve supporting the scarifier teeth 78. This is considered fully equivalent.

FIGS. 7 and 8 illustrate another modification of the scarifier assembly 16. Some conditions call for working the soil less aggressively than the scarifier teeth 78 would provide. In such situations, tine subassemblies 90 can be substituted for the scarifier subassemblies 77 on the cross shaft 76. Each tine subassembly 90 includes a sleeve 92 with a flange 94 and tool bar 96 secured thereto. Bushings 98 of plastic or other suitable construction are preferably provided in opposite ends of the sleeve 92. A plurality of depending tines 100 are secured to the tool bar 96. As illustrated, the lower ends of the tines 100 diverge outwardly, however, this is not critical to practice of the invention and either straight or curved tines can be utilized as desired. Each tine subassembly 90 further includes a stop 102 thereon for cooperation with another stop 104 mounted on the next adjacent trailing ground engaging member 20. Since the tines 100 are generally less rigid than the scarifier teeth 78, the use of such separate stop structure is preferable. If desired, of course, such separate stop structure could also be adapted for use with the scarifier subassemblies 77. Another cylinder 136 is coupled between the frame brace 46 and the forward cross member 122 of the attachment 110 for controlling its pivotal positioning.

Figure 9:
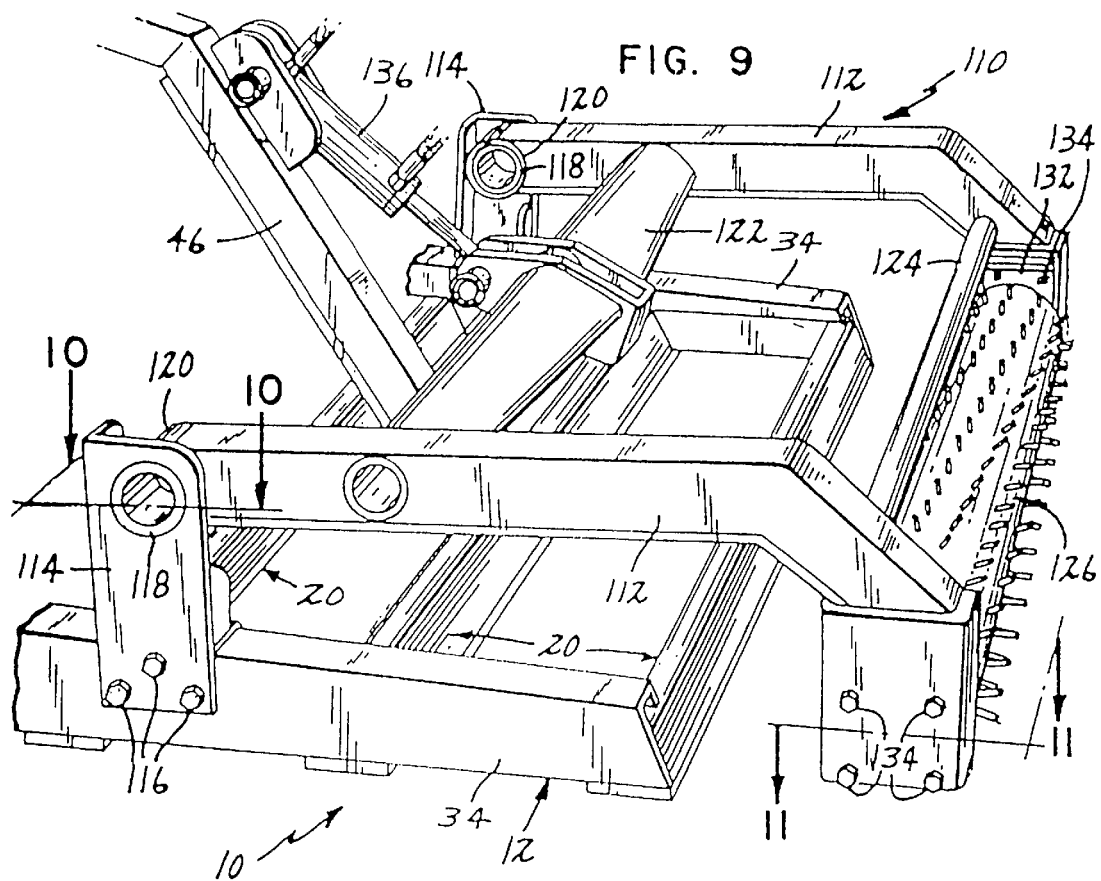
FIG. 9 is a partial perspective view showing the soil leveling apparatus herein with an optional pivotal pulverisor assembly mounted thereon.
Figure 10:
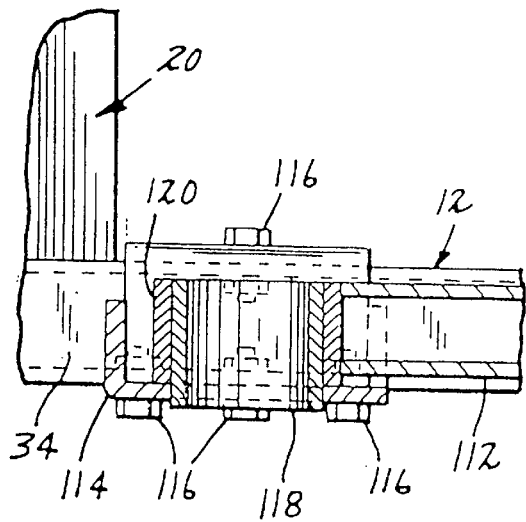
FIGS. 10 and 11 are sectional views taken along lines 10—10 and 11—11, respectively, of FIG. 9 in the direction of the arrows.
Figure 11:
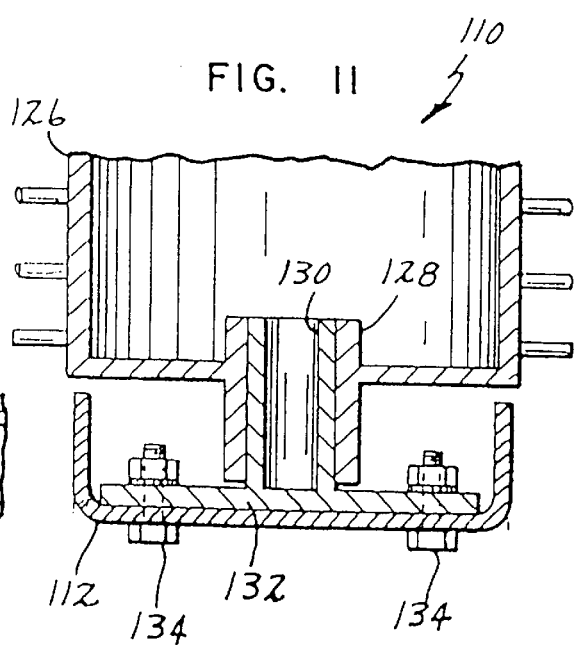
Figure 15:
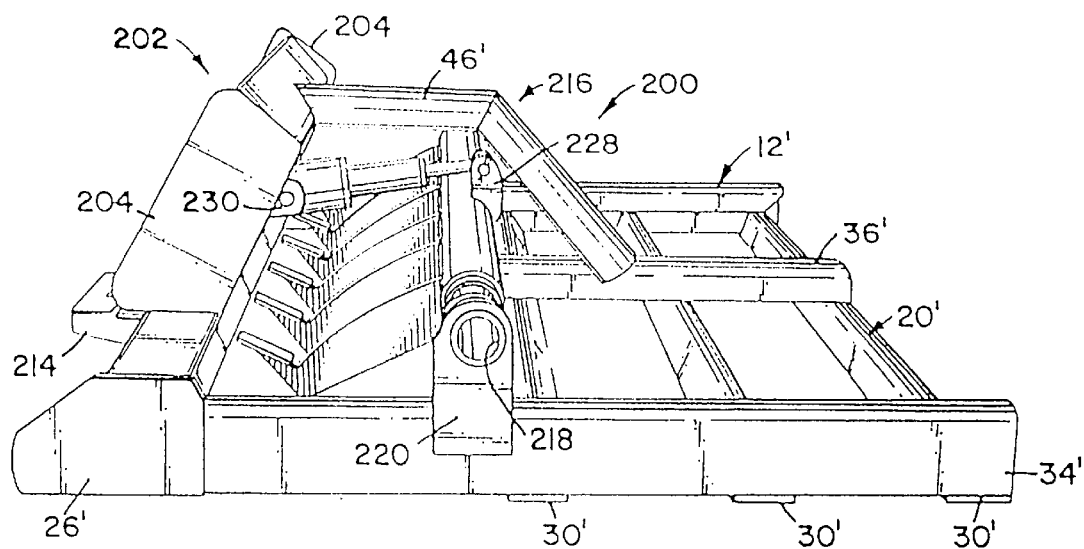
FIG. 15 is a perspective view of an improved soil leveling apparatus incorporating a second embodiment of the invention.
Figure 18:
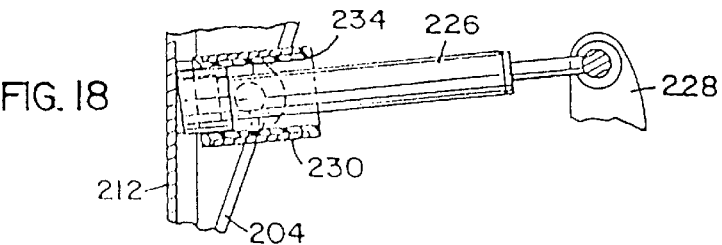
FIG. 18 is a partial cross sectional diagram showing the relationship between the cylinder and collar of the actuator used in the scarifier assembly.

Referring now to FIGS. 9, 10 and 11, there is shown an optional pulverizer attachment 110 which can be mounted on the soil leveling apparatus 10 to provide additional soil working. The attachment 110 includes a pair of arms 112 which are pivoted at their forward ends to brackets 114 secured by bolts 116 to the side members 34 of frame 12. Each bracket 114 includes an inner sleeve 118 on which an outer sleeve 120 of the associated arm is received to define a pivot. A pair of cross members 122, 124 are secured between the arms 112 for rigidity and bracing. A toothed roller 126 is mounted for rotation between the outer or trailing ends of the arms 112. As is best seen in FIG. 11, a bushing 128 is provided in each end of the roller 126 for rotation on all inwardly projecting trunion 130 on a plate 132 secured by bolts 134 to the associated arm 112. This type of mounting enables the roller 126 to span substantially the entire width of the apparatus 10 so that the apparatus can be operated closely adjacent to buildings, sidewalks, etc. Although the assembly 110 is illustrated with a toothed roller 126 for pulverizing small dirt clods and the like, it will be appreciated that other devices can be mounted on the attachment. For example, a row of spring fingers or flexible tines can easily be substituted for the toothed roller 126 and carried by the attachment 110.

FIGS. 12 and 14 illustrate a modification of the tine sub-assembly 90 shown in FIGS. 7 and 8. In the subassembly 90, the tines 100 are secured in fixed relationship to the tool bar 96. Although this construction is sufficiently rugged for most applications, the tines can become damaged and require replacement. Since the tine sub-assembly 90 is not particularly well suited to individual replacement of the tines, the tool bar 96 can be replaced with a channel-like member 140 having a plurality of individual tine carriers 142 secured in laterally spaced apart relationship thereto. Each carrier 142 is of generally cylindrical construction, with a flat upper end and a beveled lower end. Replaceable tines 144 and 146 are individually mounted in the carriers 142. The tines 144 are substantially straight, while the tines 146 are angled and positioned in alternate carriers 142. Each of the tines 144 and 146 includes a threaded upper end extending through the respective carrier 142 and being secured in place by means of a washer 148 and nut 150. In addition, each of tines 144 and 146 includes an upset portion or raised lug 152 thereon which engages the beveled lower ends of the carrier 142 so as to effect automatic centering when the nuts 150 are tightened. It will thus be apparent that the tines 144 and 146 can be readily replaced individually.

FIG. 13 shows another tine 154 having a straight portion and offset leg portion 156 that can be used in the position of the endmost tine in the sub-assembly 90 in order to span the gaps between adjacent tine sub-assemblies and thus effect scarifying over substantially the entire width of the scarifier assembly 16. The offset tine 154 also includes a raised lug 152 for centering purposes, and an auxiliary stop 158 is preferably secured to the respective end of the member 140 to reinforce the offset tine against bending and rotation.

Referring now to FIGS. 15–19, there is shown a soil leveling apparatus 200 incorporating a second embodiment of the invention. The soil leveling apparatus 200 of the second embodiment incorporates numerous component parts which are substantially similar to those employed in the apparatus 10 of the first embodiment herein. Such component parts have been identified with the same reference numerals utilized herein before, but have been differentiated therefrom by means of prime (') notations.

The primary difference between the soil leveling apparatus 200 of the second embodiment and the apparatus 10 of the first embodiment is centered in the areas of the hitch and the scarifier assembly. The apparatus 10 of the first embodiment incorporates a connection means 14 which is adapted for use with a three-point hitch, like that typically used on tractors. The soil leveling apparatus 200 of the second embodiment, however, preferably includes a hitch 202 which is particularly adapted for use with adapters of the type found on skid steer loaders, although either type of hitch can be used.

The hitch 202 comprises a pair of laterally spaced apart side plates 204 which are interconnected by cross plates 206 and 208 defining a converging recess for receiving the upper edge of the pivotal edge adapter plate on the loader. As shown, the cross plate 206 is reinforced by a channel section 210 and an upright post 212. A pair of laterally spaced apart lower mount plates 214 are secured to the front wall of the leading ground engaging member 18' for releasable connection with latches on the lower end of the adapter plate (not shown) on the loader. An adaptor plate of suitable construction is shown in U.S. Pat. No. 3,672,521, the entire disclosure of which is incorporated herein by reference.

As illustrated, the soil leveling apparatus 200 also includes an optional scarifier assembly 216. The apparatus 200 can be used either with or without the scarifier assembly 216. As shown the scarifier assembly 216 includes a fixed cross shaft 218 secured between a pair of brackets 220 fixed to the longitudinal side members 34', which are preferably of inverted generally J-shaped cross section as is best seen in FIG. 21, although side members of any suitable configuration can be used. A sleeve 222 is supported for rotation about the fixed shaft 218, and a plurality of depending scarifier teeth 224 are secured along the sleeve.

Figure 17:
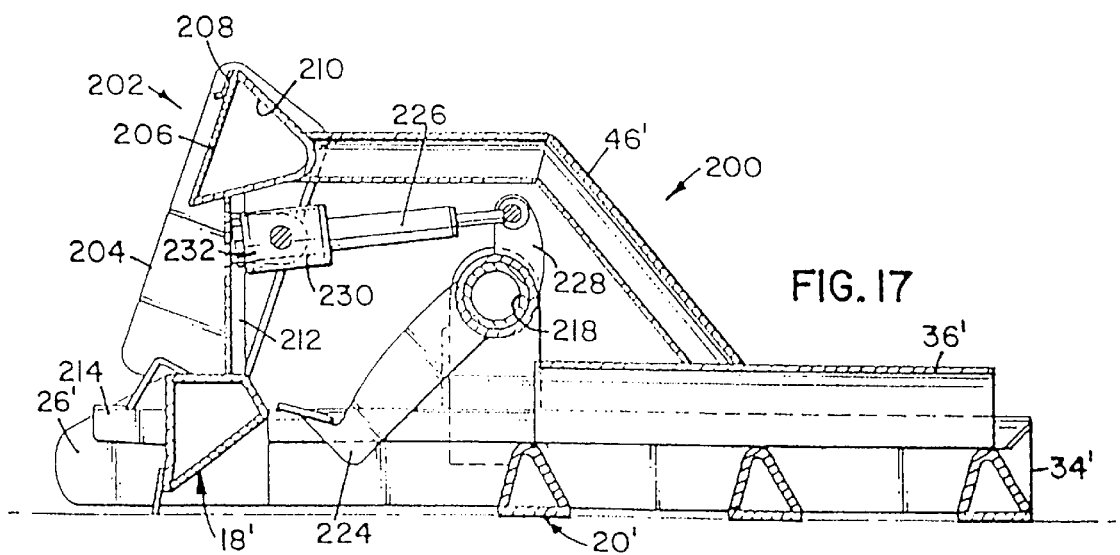
FIG. 17 is a vertical sectional view taken along lines 17—17 of FIG. 16 in the direction of the arrows.
Figure 16:
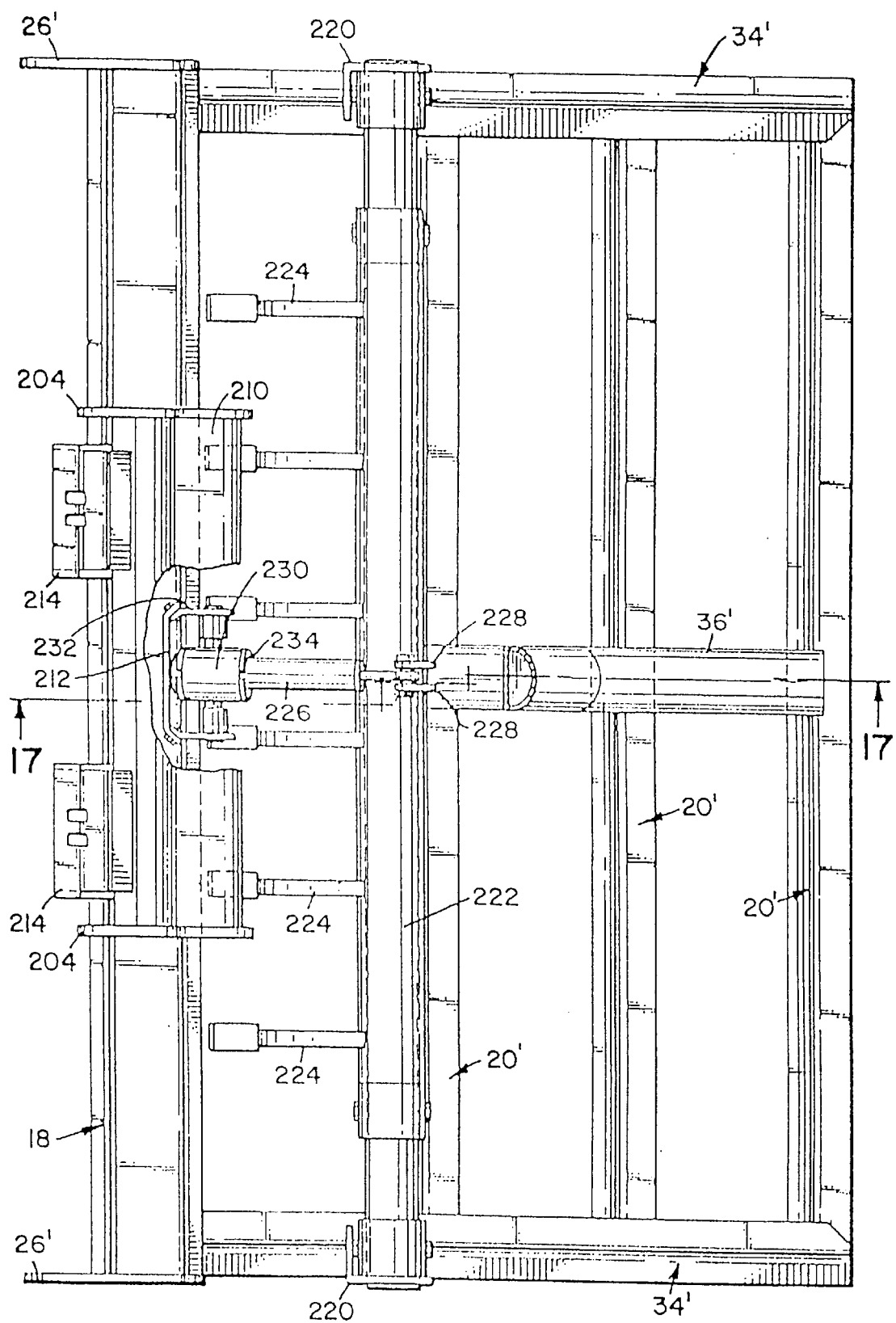
FIG. 16 is a top view of the soil leveling apparatus.

The scarifier assembly 216 is actuated by a cylinder 226 coupled between an offset lug 228 secured to the sleeve 222, and a collar 230 as is best seen in FIG. 17. The piston end of cylinder 226 is coupled to lug 228, while the cylinder end thereof is slideably received in the collar 230. The collar 230 is pivoted on a pair of trunions secured between a pair of lugs 232 on the post 212. In the preferred embodiment, a liner 234 of plastic or other suitable low friction material is provided within the collar 230 to facilitate slideable movement of the cylinder 226. This construction thus provides a lost motion connection which enables the operator to reverse direction with the scarifying teeth 224 pivoting upward and riding on the ground, but without actuating cylinder 226. When cylinder 226 is extended, the cylinder end thereof moves within collar 230 into stopped engagement with post brace 212 so that the scarifier teeth 224 are raised completely or partially out of engagement with the soil. When the cylinder 226 is retracted, the scarifier teeth 224 simply return to their lowered positions, undergravity, as the cylinder end slides away from post 212 in the collar 230, thus providing a lost motion connection which enables the teeth to ride up out of engagement with the soil when the unit is reversed without requiring actuation of the cylinder.

It will be noted that the soil leveling apparatus 200 also incorporates a longitudinal member $36^1$ and a longitudinal brace $46^1$ of generally channel-like construction, but more rounded in order to facilitate forming in a simpler, less expensive manner. In all other respects, the soil leveling apparatus 200 is functionally and structurally similar to the apparatus 10.

FIGS. 19 and 20 illustrate a modification involving usage of an intermediate bracket 236 supporting the cross shaft 218 and providing reinforcement against bending. Usage of an intermediate support bracket 236, however, requires splitting the sleeve 222 into sleeve sections 222-A and 222-B, each of which is provided with a pair of lugs 228-A as is best seen in FIG. 19. In addition, instead of a collar 230, the cylinder 226 has been provided with a clevise 238 which is supported on a pin 240 extending between lugs 232 to provide a lost motion connection.

It will be understood that the positions of collar 230 on clevis 238 could be reversed, if desired. Any such reversal is considered fully equivalent.

The trailing ground engaging members $20^1$ can be of closed construction including wearplates $30^1$ secured to and enclosing the open ends of hollow members $32^1$. In the alternative, however, ground engaging members 242 of open construction as shown in FIG. 19 can be utilized. Each open ground engaging member 242 comprises a hollow member $32^1$, which is preferably of generally inverted rounded V-shaped cross section with the forward wall thereof being substantially upright in order to push the soil in a forward direction, and the rear wall being inclinded to allow the soil to pass over the ground engaging member in the reverse direction. However, no wearplate $30^1$ is utilized, and a small blades 244 and 246 can be secured to the walls of the hollow member $232^1$ to improve cutting action and wear resistance.

From the foregoing, it will thus be apparent that the present invention comprises an improved soil leveling apparatus having several advantages over the prior art. One significant advantage involves use of an adjustable lost motion connection with the connecting means to provide controlled flexibility and some float of the apparatus in order to compensate for various three-point hitches and soil conditions. Another advantage involves the use of a forward ground engaging member which is not susceptible to clogging under sticky soil conditions in order to perform a scraping function more effectively. The connecting means also serves as the primary support for the scarifier assembly. Other advantages will be evident to those skilled in the art.

Figure 23:
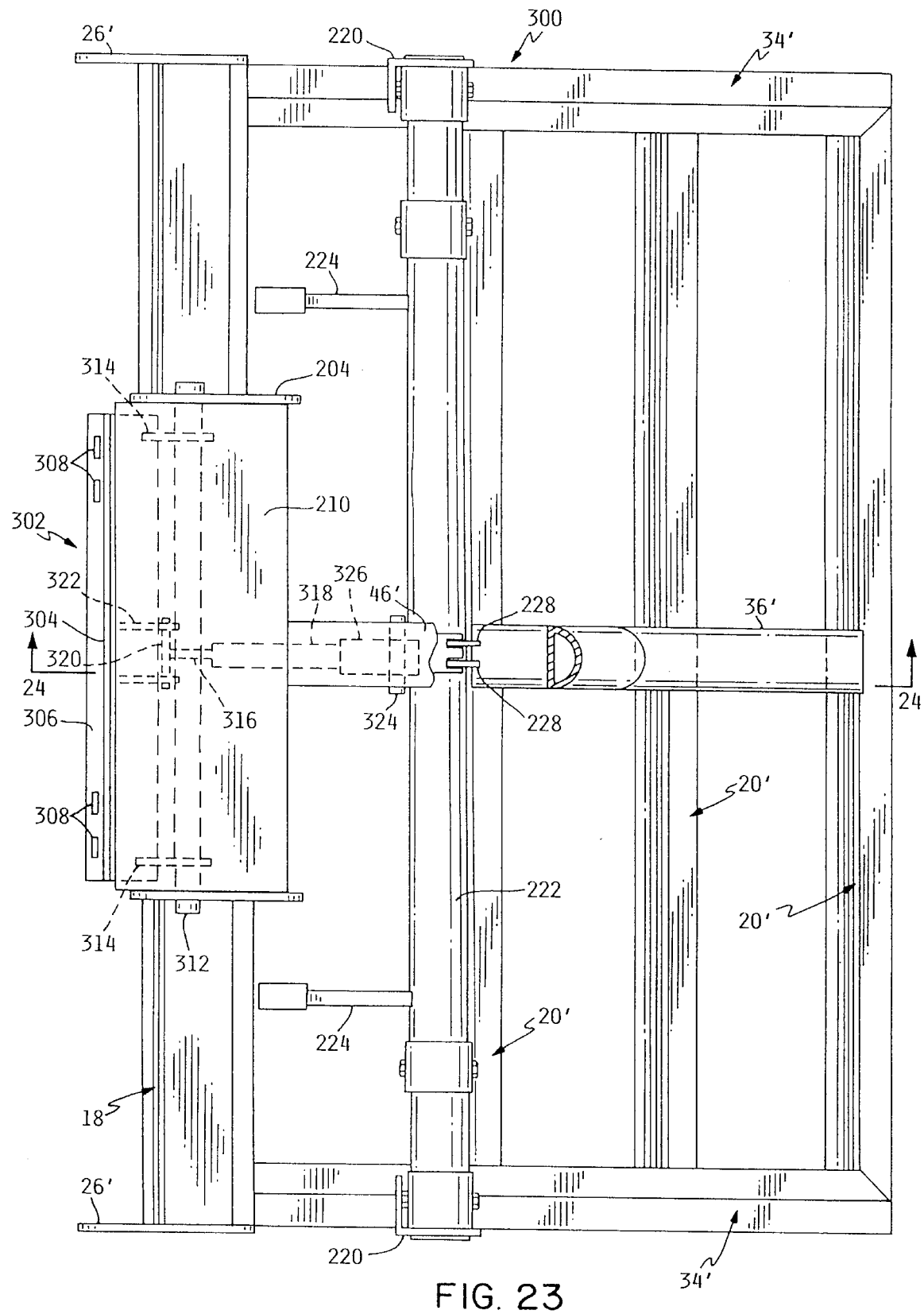
FIG. 23 is a top plan view of an improved soil leveling apparatus incorporating a third embodiment of the invention.
Figure 24:
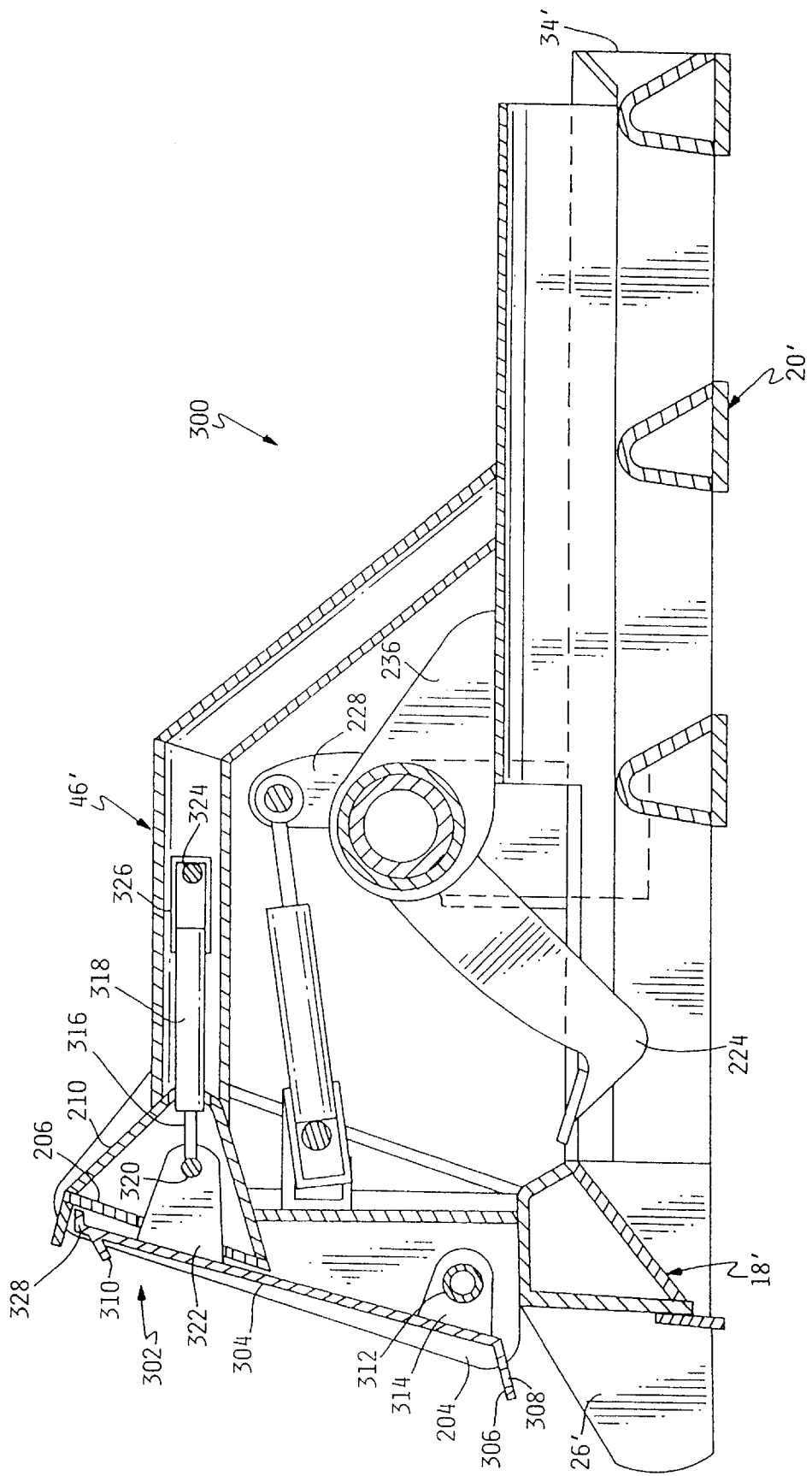
FIG. 24 is a vertical cross-sectional view taken along lines 24—24 of FIG. 23, particularly illustrating the hitch plate being placed in a rigid, non-floating orientation relative to the skid steer loader to which it is coupled.
Figure 25:
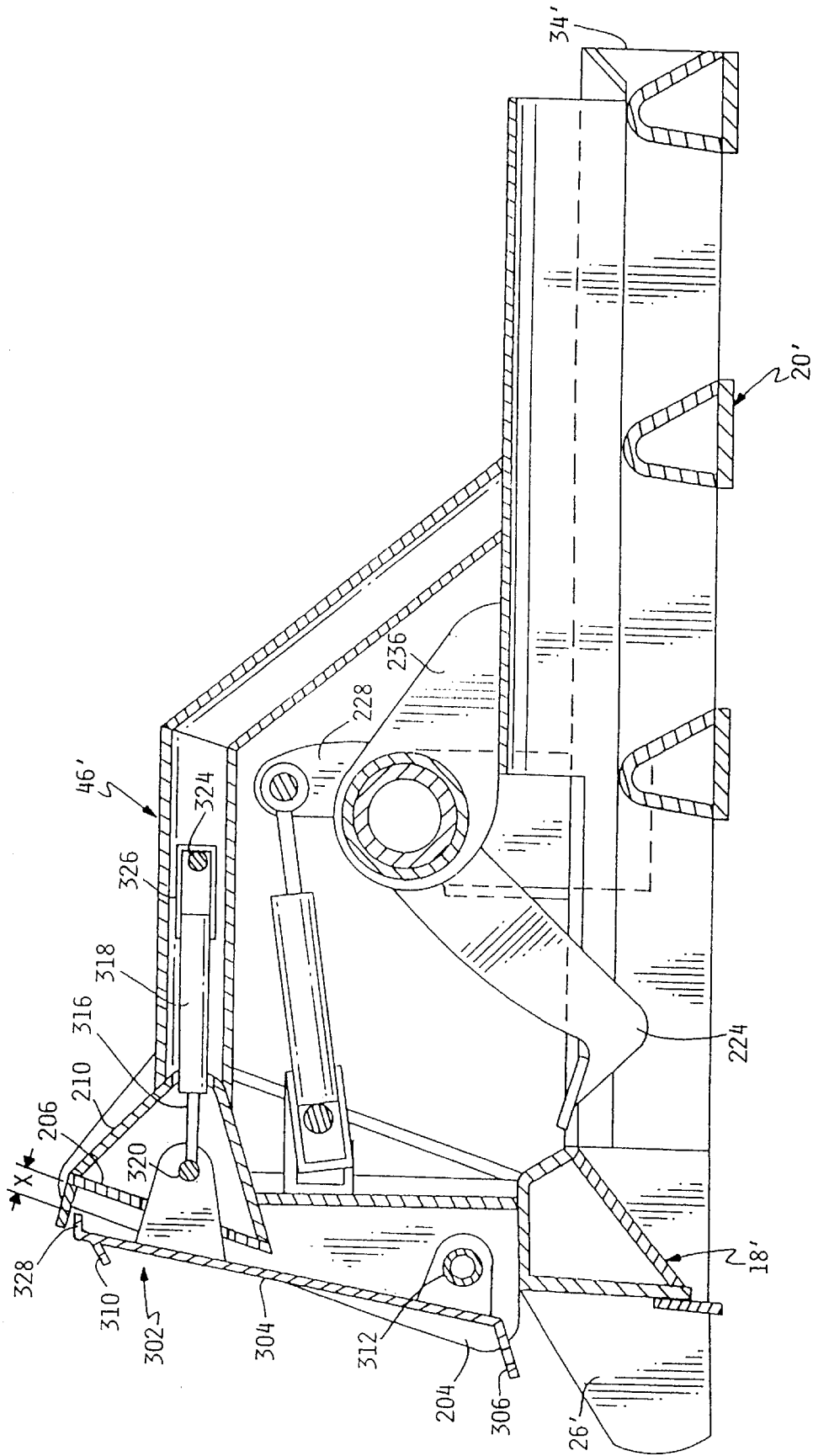
FIG. 25 is a vertical cross-sectional view similar to FIG. 24, particularly illustrating the hitch plate being placed in a floating orientation relative to the skid steer loader to which it is coupled.

Referring now to FIGS. 23–25, a third embodiment of an improved soil leveling apparatus according to the present invention is illustrated as 300. Soil leveling apparatus 300 incorporates numerous component parts which are substantially similar to those employed in soil leveling apparatus 200 of the second embodiment. Such similar components in soil leveling apparatus 300 will be identified using the same reference numerals used in connection with these components in soil leveling apparatus 200.

Like soil leveling apparatus 200, soil leveling apparatus 300 utilizes a hitch 302 that is adapted to be connected to a skid steer loader or similar vehicle (not shown). However, hitch 302 used in conjunction with apparatus 300 is not the same as hitch 202 used on apparatus 200. Instead, hitch 302 used on soil leveling apparatus 300 allows the operator of the skid steer loader to selectively allow apparatus 300 to float relative to the skid steer loader or to be made rigid relative to the loader, all as will be described hereafter.

Before describing hitch 302 used in conjunction with apparatus 300, it would be best to review the operation of hitch 202 disclosed for use with apparatus 200. Such a hitch 202 includes structure for holding the conventional adaptor plate provided on the skid steer loader. This structure includes the recess defined by the plates 206 and 208 for holding the upper edge of the adaptor plate and the lower mount plates 214 for connecting to latches provided on the lower end of the adaptor plate. As is well known in the art, the adaptor plate is itself connected to the loader arms (not shown) of the skid steer loader and to the hydraulic tilt cylinder(s) (also not shown) provided on those loader arms. Thus, apparatus 200 can be lifted up and down vertically relative to the ground by the operation of the loader arms, and apparatus 200 can be tilted or inclined relative to the ground by the operation of the hydraulic tilt cylinder(s) on the loader arms.

In operating apparatus 200, what was the back or rear end of the apparatus 200 when such apparatus had a three point hitch and was being towed behind a tractor, e.g. the embodiment shown in FIGS. 1–14, becomes the front end of apparatus 200 when connected to a skid steer loader using hitch 202. Thus, the rearmost ground engaging member 20' becomes the forwardmost ground engaging member on apparatus 200, and vise versa, taken with respect to the normal forward direction of motion of the skid steer loader. The shallower rear wall of this ground engaging member 20', which becomes the front wall of the member in this situation, will cut into the soil as the skid steer loader is driven in a forward direction with the soil being lifted up and over the ground engaging member 20' during forward motion of the skid steer loader. The steeper front wall of member 20', which becomes the rear wall of the ground engaging member 20' in this situation, is then effective to level or grade the soil during reverse motion of the skid steer loader.

One advantage of hitch 202 is that the angle of apparatus 200 relative to the ground, and hence the angle of the walls of ground engaging members 20', can be easily adjusted simply by manipulating the hydraulic tilt cylinder(s) of the skid steer loader. This allows the operator, for example, to tilt apparatus 200 more steeply relative to the ground to let the walls of the ground engaging members 20' be more aggressive in cutting into the soil during forward motion of the skid steer loader. Conversely, the operator can lessen the angle of inclination of apparatus 200 to decrease the aggressiveness of the cutting action provided by these walls. Similar, angular adjustments can be selectively made during reverse motion of the skid steer loader to help place the other walls of the ground engaging members 20' at the best angle for smoothing and grading the soil.

While a skid steer loader provides certain advantages in being able to tilt apparatus 200 during operation, both while cutting soil with forward motion of the skid steer loader or while grading soil during rearward motion of the loader, one disadvantage is that apparatus 200 is rigidly connected at all times to the loader arms of the loader. While the angle of inclination of apparatus 200 may be adjusted as noted above, once a particular angle is set, then apparatus 200 is rigid relative to the loader during operation.

Skid steer loaders have a short wheel base and their ground engaging wheels are connected directly to the loader frame without using a suspension. Thus, when a skid steer loader is being operated over uneven ground, the weight of the loader will often shift from the front wheels to the back wheels, causing the loader to frequently pitch up or down. This causes apparatus 200 to be frequently lifted up out of contact with the ground, or to have the front of apparatus 200 dig down into the ground, due to the rigid connection between the loader and apparatus 200. This is inconvenient, to say the least, and requires a very skilled operator who can attempt to correct for this by suitable manipulation of the loader arms and/or the hydraulic tilt cylinder(s) during a soil cutting and/or grading operation. Even with a skilled operator, it is difficult to grade when attachment 200 is connected to a skid steer loader being operated over uneven ground.

The Applicant has devised a solution to this problem. That solution is to allow the operator to be able to selectively place the apparatus into a rigid orientation with the loader, i.e. the apparatus is rigid relative to a particular position of the loader arms and hydraulic tilt cylinder(s), or to place the apparatus into a floating orientation relative to the loader, i.e. the apparatus can pivot up and down in a fore-and-aft direction relative to the loader arms as the loader is being driven in a forward or reverse direction. Thus, if the ground is substantially flat and the operator wishes to be able incline the apparatus relative to the ground using the tilt cylinder(s) on the loader arms, then he would select or use the rigid orientation of the apparatus. On the other hand, if the ground were very uneven and/or a rough grading operation were being performed, the operator would select the floating orientation of the soil leveling apparatus.

This solution described above is illustrated in the apparatus 300 shown in FIGS. 23–25. In this case, a hitch 302 is provided for connecting to the adaptor plate (not shown) disclosed in U.S. Pat. No. 3,672,521, which patent was previously incorporated by reference herein. While a hitch 302 designed to connect to this particular adaptor plate, used on a particular brand of skid steer loaders, will be illustrated herein, other brands of skid steer loaders may have other types of adaptor plates. The present invention contemplates simply that hitch 302 will have structure suitable for connecting to any of the available adaptor plates used on all skid steer loaders.

Hitch 302 comprises a hitch plate 304 which is generally designed to fit in the space provided between side plates 204. Hitch plate 304 has a lower end which is formed as a substantially horizontal flange 306 extending towards the rear of apparatus 300. Flange 306 is provided on either side thereof with slots 308 for connection to the latches provided on the lower end of the adaptor plate. In this connection, these slots are similar to the slots shown in the mount plates 214.

In addition, the upper edge of hitch plate 304 includes a downwardly inclined, forwardly extending lip 310 which is suited for abutting against the top edge of the adaptor plate for holding the top of the adaptor plate in place. In this connection, lip 310 is similar to the recess or lip formed by the plates 206 and 208. When the adaptor plate is inserted onto hitch plate 304, with its top edge engaged beneath lip 310 and the latches on the bottom of the adaptor plate engaged with slots 308, apparatus 300 will be connected to the loader arms of the skid steer loader. Thus, apparatus 300 can be raised or lowered by raising or lowering the loader arms, and apparatus 300 can be tilted or inclined relative to the horizontal by using the hydraulic tilt cylinder(s) on the loader arms.

Hitch plate 304 is not, however, necessarily made rigid with the frame of apparatus 300. Instead, hitch plate 304 is pivotally connected between the side plates 204 by a transverse pivot shaft 312 extending between side plates 204, hitch plate 304 being rotatably journalled on shaft 312 by link arms 314 which extend forwardly from hitch plate 304. Thus, apparatus 300 will be able to pivot relative to the skid steer loader about transverse pivot shaft 312, assuming hitch 302 is placed into its floating orientation, as will now be described.

The upper end of hitch plate 304 has the front side thereof connected to the piston arm 316 of a conventional hydraulic cylinder 318. Piston arm 316 is pivotally connected by a pivot shaft or connecting pin 320 to one or more ears 322 extending from the front of hitch plate 304. These ears 322 pass through slots into the interior of the cross beam formed by the plates 206 and 210.

Hydraulic cylinder 318 is itself mounted inside the longitudinal beam 46' of the frame of apparatus 300 with cylinder 318 extending from there into the interior of the cross beam. The front end of cylinder 318 is also pivotally mounted to the longitudinal beam 46' by a pivot shaft or pin 324. Cylinder 318 further includes a U-shaped collar or clevis 326 which is fixedly secured, as by welding, to its front end which collar or clevis 326 receives the pivot shaft or pin 324. Thus, cylinder 318 can slide fore-and-aft on pivot shaft 324, since collar or clevis 326 can slide fore-and-aft on pivot shaft 324, in addition to rotating about shaft 324.

Hydraulic cylinder 318 is provided with conventional means for extending or retracting piston arm 316. This is done by selectively causing fluid to flow into cylinder 318 on one side or the other of the piston, to thereby extend or retract piston arm 316. Preferably, this would be accomplished by the operator from a spot convenient to his seat on the skid steer loader, e.g. by manipulating a control member near his seat to cause piston arm 316 to extend or retract. However, the control member could be provided adjacent cylinder 318 if so desired.

The face of hitch plate 304 includes an outwardly extending hitch stop member 328 which is designed to abut against the front face of the cross beam, i.e. against the front of plate 206, when piston arm 316 of cylinder 318 is fully or almost fully retracted. When hitch stop 328 is so arranged, hitch 302 is made rigid with the frame of apparatus 300, and hence apparatus 300 is made rigid with the skid steer loader. Thus, the operator, by selectively manipulating cylinder 318 to retract piston arm 316, can selectively place apparatus 300 into a rigid orientation relative to the loader arms, to thereby allow the loader arms to be used to control the height of apparatus 300, and to allow the tilt cylinder(s) on the loader arms to be used to control the inclination of apparatus 300.

However, assuming the operator wishes to allow apparatus 300 to float relative to the loader and relative to the ground, he could selectively place the loader into a floating orientation by manipulating cylinder 318 to extend piston arm 316 out of cylinder 318. This pushes hitch stop 328 away from plate 206, until a small gap, identified as x in FIG. 25, is present therebetween. Now, if apparatus 300 is operated over uneven ground, such that apparatus 300 would naturally tend to follow the ground level, fore-and-aft pivoting of apparatus 300 relative to hitch plate 304 is allowed by a pivoting motion about transverse pivot shaft 312. During such pivoting motion, cylinder 318 will be able to slide fore-and-aft on shaft 324 by virtue of U-shaped collar or clevis 326 slidably received on shaft 324 in order to accommodate the floating motion of apparatus 300.

The amount of the floating motion allowed when apparatus 300 tips up relative to the loader, i.e. a counterclockwise motion of apparatus 300 about pivot shaft 312, is determined by the amount of the gap x. When the gap x is closed by the pivoting action of apparatus 300 with hitch stop 328 reengaging against plate 206, then no further pivoting motion of apparatus 300 will be allowed in this direction. Thus, apparatus 300 provides for a limited amount of floating in this direction with that amount being easily adjustable by the location of hitch stop 328, i.e. essentially by how far out of cylinder 318 piston arm 316 is extended.

Other methods for allowing apparatus 300 to selectively float relative to the skid steer loader could be provided. For example, hydraulic cylinder 318 as shown in FIGS. 23–25, having the adjustable hitch stop 328 for limiting the amount of flotation in one direction, could be replaced by a standard hydraulic cylinder with no hitch stop 328 being used. Hitch plate 304 would be free to pivot in both directions relative to the frame of apparatus 300. Normally, hydraulic fluid flow to this cylinder would be inhibited to make apparatus 300 rigid relative to the loader, the piston arm of the cylinder essentially locking the hitch plate in place. However, to allow apparatus 300 to float, all that would be required would be to allow free hydraulic fluid flow to and from both sides of the piston, thus allowing hitch plate 304 to float in both directions. Some mechanical stops could be used which would eventually contact hitch plate 304 if it were desired to limit the maximum flotation in either direction. Alternatively, some type of stop or limit means could be used with the hydraulic valving mechanism provided for this cylinder.

Another alternative is to use mechanically interposed locking means to lock hitch plate in place relative to apparatus 300 to make apparatus 300 rigid relative to the loader. For example, threaded locking bolts extending between the apparatus 300 and hitch plate 304 could be used to lock or hold hitch plate in place. To selectively place hitch plate into its floating orientation, i.e. the orientation in which it is free to pivot about shaft 312, all that would be required would be the removal of these locking bolts by the operator.

The versions of apparatus 300 described so far all envision a hitch which can selectively be made rigid relative to the loader or can selectively be allowed to float, all as decided by the operator depending upon the terrain being encountered and the type of grading that is desired, e.g. finish grading or rough grading. However, a purely floating orientation of hitch 302 relative to the frame of apparatus 300 would also be useful, particularly when the apparatus 300 is being operated by less skillful operators over a wide variety of soil conditions and terrains. In this event, hitch plate 204 would simply always be pivotal relative to the frame of apparatus 300. Stops could be used to limit the amount of flotation in both directions of pivotal motion about pivot shaft 312, i.e. hitch plate 304 would engage the stops after a predetermined amount of rotation.

Although particular embodiments of the invention have been illustrated in the accompanying drawings and described in the foregoing detailed description, it will be understood that the invention is not limited only to the embodiments discloses, but is intended to embrace any equivalents, modifications, substitutions and/or rearrangements of elements falling within the scope of the invention as defined by the following claims.

I claim:

1. An apparatus for working soil, the apparatus suited for being connected to a skid steer loader type vehicle having vertically movable loader arms and at least one tilt cylinder, the skid steer loader type vehicle further having an adaptor plate pivotally joined to the loader arms with the at least one tilt cylinder having one end thereof connected to the adaptor plate for pivoting the adaptor plate about the loader arms during activation of the at least one tilt cylinder, comprising:

a frame including at least one transverse ground engaging member for working soil; and hitch means mounted on said frame for releasable connection to the loader arms and the at least one tilt cylinder of the skid steer loader, whereby the hitch means includes selectively operable means for placing the frame into either a first rigid orientation relative to the skid steer loader where the frame can then be raised and lowered relative to the ground by the loader arms and the frame can be inclined relative to the ground by the at least one tilt cylinder or into a second floating orientation relative to the skid steer loader where the frame can move up and down relative to the loader arms and at least one tilt cylinder to follow the ground terrain, whereby the user can selectively choose either the first rigid orientation or the second floating orientation of the hitch, wherein the hitch means is configured such that the frame in its floating orientation is pivotally mounted relative to the loader, and wherein the hitch means comprises a hitch plate pivotally connected to the frame for pivotal motion such that the floating orientation of the frame is achieved by pivoting of the frame relative to the hitch plate, and wherein the hitch plate includes means for rigidly connecting the hitch plate to the adaptor plate of the loader.

2. The apparatus of claim 1, wherein the selectively operable means includes means for selectively preventing rotation of the hitch plate relative to the frame such that the frame is rigidly connected to the loader through the hitch plate and for selectively allowing rotation of the hitch plate on the frame to allow the frame to rotate relative to the hitch plate and hence to the loader.

3. The apparatus of claim 2, wherein the hitch plate includes a hitch stop which is drawn into engagement with an abutment on the frame to prevent rotation of the hitch plate relative to the frame and which can be spaced away from the abutment on the frame to allow rotation of the hitch plate on the frame.

4. The apparatus of claim 3, further including means for selectively positioning the hitch stop either in or out of engagement with the abutment.

5. The apparatus of claim 4, wherein the means for selectively positioning the hitch stop comprises a hydraulic cylinder.

6. The apparatus of claim 4, wherein the pivotal hitch plate includes an upper lip and a lower flange extending to one side thereof and spaced apart therefrom to allow the adaptor plate to be received between the upper lip and lower flange of the hitch plate.

7. The apparatus of claim 6, wherein the pivotal hitch plate includes a second lip extending from the side of the hitch plate that is opposite to the side having the upper lip, the second lip forming the hitch stop.

8. The apparatus of claim 1, wherein the hitch means comprises a hitch plate pivotally connected to the frame for pivotal motion about a transverse, substantially horizontal, pivot axis.

9. The apparatus of claim 1, wherein the ground engaging member is a fixed member which is stationary relative to the frame.

10. The apparatus of claim 1, wherein a plurality of transverse ground engaging members are carried on the frame with each ground engaging member comprising a fixed member which is stationary relative to the frame and with the ground engaging members being spaced apart longitudinally on the frame.

11. The apparatus of claim 1, wherein the pivotal hitch plate includes an upper lip and a lower flange extending to one side thereof and spaced apart therefrom to allow the adaptor plate to be received between the upper lip and lower flange of the hitch plate.

12. An apparatus for working soil, the apparatus suited for being connected to a skid steer loader type vehicle having vertically movable loader arms and at least one tilt cylinder, the skid steer loader type vehicle further having an adaptor plate pivotally joined to the loader arms with the at least one tilt cylinder having one end thereof connected to the adaptor plate for pivoting the adaptor plate about the loader arms during activation of the at least one tilt cylinder, comprising:

a frame including at least one transverse ground engaging member for working soil; and hitch means mounted on said frame for releasable connection to the loader arms and the at least one tilt cylinder of the skid steer loader, whereby the hitch means includes a lost motion connection between the frame and the loader arms and the at least one tilt cylinder of the skid steer loader to allow the frame to float relative to the ground terrain as the skid steer loader is being driven over the ground terrain, wherein the hitch means comprises a hitch plate pivotally connected to the frame for pivotal motion such that the floating orientation of the frame is achieved by pivoting of the frame relative to the hitch plate, and wherein the hitch plate includes means for rigidly connecting the hitch plate to the adaptor plate of the loader.

13. The apparatus of claim 12, wherein the hitch means comprises a hitch plate pivotally connected to the frame for pivotal motion about a transverse, substantially horizontal, pivot axis.

14. The apparatus of claim 12, wherein the ground engaging member is a fixed member which is stationary relative to the frame.

15. The apparatus of claim 12, wherein a plurality of transverse ground engaging members are carried on the frame with each ground engaging member comprising a fixed member which is stationary relative to the frame and with the ground engaging members being spaced apart longitudinally on the frame.

16. An apparatus for working soil, the apparatus suited for being connected to a skid steer loader type vehicle having vertically movable loader arms and at least one tilt cylinder, the skid steer loader type vehicle further having an adaptor plate pivotally joined to the loader arms with the at least one tilt cylinder having one end thereof connected to the adaptor plate for pivoting the adaptor plate about the loader arms during activation of the at least one tilt cylinder, comprising:

a frame including at least one transverse ground engaging member for working soil; and hitch means mounted on said frame for releasable connection to the loader arms and the at least one tilt cylinder of the skid steer loader, whereby the hitch means includes a hitch plate which is pivotally mounted on the frame and rigidly connected to the adaptor plate; and floating means for selectively allowing the hitch plate to pivot on the frame such that the frame can float over ground terrain during operation of the skid steer loader, wherein the floating means comprises a piston cylinder assembly connected between the frame and the hitch plate with the piston cylinder assembly having a lost motion connection to the frame to provide for movement of the hitch plate.

17. The apparatus of claim 16, wherein the piston cylinder assembly has a first end pivotally connected to the frame on a pivot shaft and a second end connected to the hitch plate, and further including a U-shaped collar or clevis fixedly secured to the first end of the piston cylinder assembly with the U-shaped collar or clevis having a sliding connection to the pivot shaft to allow the first end of the piston cylinder assembly to slide in a fore and aft direction on the pivot shaft during floating of the frame over the ground terrain.

18. The apparatus of claim 17, wherein the hitch plate includes a hitch stop which is drawn into engagement with an abutment on the frame to prevent rotation of the hitch plate on the frame and which can be spaced away from the abutment on the frame to allow rotation of the hitch plate on the frame, the extension and retraction of the piston rod in the cylinder moving the hitch plate, and thus the hitch stop, relative to the abutment on the frame.

19. The apparatus of claim 16, wherein the hitch means comprises a hitch plate pivotally connected to the frame for pivotal motion about a transverse, substantially horizontal, pivot axis.

20. The apparatus of claim 16, wherein a plurality of transverse ground engaging members are carried on the frame with each ground engaging member comprising a fixed member which is stationary relative to the frame and with the ground engaging members being spaced apart longitudinally on the frame.

* * * * *